(12) United States Patent
Ning et al.

(10) Patent No.: US 11,748,017 B2
(45) Date of Patent: Sep. 5, 2023

(54) INTER-DEVICE DATA MIGRATION METHOD AND DEVICE

(71) Applicant: HUAWEI TECHNOLOGIES CO., LTD., Guangdong (CN)

(72) Inventors: Yaodong Ning, Shenzhen (CN); Rongfeng Huang, Shenzhen (CN); Shangsong Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 11 days.

(21) Appl. No.: 17/000,419

(22) Filed: Aug. 24, 2020

(65) Prior Publication Data

US 2020/0387320 A1    Dec. 10, 2020

Related U.S. Application Data

(63) Continuation of application No. PCT/CN2018/081153, filed on Mar. 29, 2018.

(51) Int. Cl.
*H04W 76/14* (2018.01)
*H04W 8/00* (2009.01)
(Continued)

(52) U.S. Cl.
CPC .......... *G06F 3/0647* (2013.01); *G06F 3/0605* (2013.01); *G06F 3/067* (2013.01);
(Continued)

(58) Field of Classification Search
CPC ...... G06F 3/0647; G06F 3/0605; G06F 3/067; G06F 9/4862; H04L 5/0055;
(Continued)

(56) References Cited

U.S. PATENT DOCUMENTS 8,620,286 B2 *   12/2013   Stannard .............. G06F 16/178
                                                            705/14.49
2002/0118232 A1    8/2002   Watanabe et al.
(Continued)

FOREIGN PATENT DOCUMENTS

CN          103442350 A       12/2013
CN          104137048 A       11/2014
(Continued)

OTHER PUBLICATIONS

Extended European Search Report dated Jan. 20, 2021, issued in counterpart EP Application No. 18912621.2 (11 pages).
(Continued)

*Primary Examiner* — Juan M Guillermety
(74) *Attorney, Agent, or Firm* — WHDA, LLP (57) ABSTRACT

A method includes: interacting, by a first device, with a user through an application in a data collection range; after determining that the user is not located in the data collection range, determining, by the first device, that the user is located in a data collection range of a second device in a network; and sending, by the first device, to-be-migrated data to the second device, so that the second device continues to interact with the user based on the to-be-migrated data. The second device supports the application, the to-be-migrated data includes information about the application and progress information, and the progress information indicates progress of interaction between the first device and the user.

16 Claims, 6 Drawing Sheets

(51) Int. Cl.
  *H04W 84/18* (2009.01)
  *G06F 3/06* (2006.01)
  *H04L 5/00* (2006.01)

(52) U.S. Cl.
  CPC ........... *H04L 5/0055* (2013.01); *H04W 8/005* (2013.01); *H04W 76/14* (2018.02); *H04W 84/18* (2013.01)

(58) Field of Classification Search
  CPC ..... H04L 67/306; H04L 67/148; H04L 67/16; H04L 69/329; H04L 67/18; H04W 8/005; H04W 76/14; H04W 84/18; H04W 4/023; H04W 4/029
  See application file for complete search history.

(56) References Cited

U.S. PATENT DOCUMENTS

| | | | |
|---|---|---|---|
| 2008/0082547 A1 | 4/2008 | Hwang et al. | |
| 2013/0006650 A1 | 1/2013 | Bocirnea et al. | |
| 2013/0328996 A1* | 12/2013 | Rawat | H04W 36/0022 348/14.02 |
| 2014/0136481 A1 | 5/2014 | Quan et al. | |
| 2014/0297593 A1 | 10/2014 | Baumann et al. | |
| 2015/0195213 A1* | 7/2015 | Orita | G06F 9/5055 709/226 |
| 2016/0036923 A1 | 2/2016 | Phanishayee et al. | |
| 2016/0054805 A1 | 2/2016 | Lee | |
| 2016/0066189 A1* | 3/2016 | Mahaffey | G06F 21/88 455/405 |
| 2017/0055032 A1* | 2/2017 | Oshima | H04N 21/43615 |
| 2017/0111761 A1 | 4/2017 | Tarlton | |
| 2019/0364644 A1* | 11/2019 | Vangeel | H05B 47/17 |

FOREIGN PATENT DOCUMENTS

| | | |
|---|---|---|
| CN | 104333601 A | 2/2015 |
| CN | 104978652 A | 10/2015 |
| CN | 105308561 A | 2/2016 |
| CN | 106210800 A | 12/2016 |
| CN | 106933210 A | 7/2017 |
| CN | 107239139 A | 10/2017 |
| CN | 107621784 A | 1/2018 |
| WO | 2017/030663 A1 | 2/2017 |

OTHER PUBLICATIONS

International Search Report dated Nov. 29, 2018, issued in counterpart Application No. PCT/CN2018/081153, with English Translation. (12 pages).

Communication about intention to grant a European patent dated Oct. 14, 2022, issued in counterpart EP Application No. 18912621.2. (39 pages).

Extended (Supplementary) European Search Report dated Jul. 6, 2023, issued in counterpart EP Application No. 23152930.6. (11 pages).

* cited by examiner

INTER-DEVICE DATA MIGRATION METHOD AND DEVICE

CROSS-REFERENCE TO RELATED APPLICATIONS

This application is a continuation of International Application No. PCT/CN2018/081153, filed on Mar. 29, 2018, the disclosure of which is hereby incorporated by reference in its entirety.

TECHNICAL FIELD

This application relates to the field of data migration technologies, and in particular, to an inter-device data migration method and a device.

BACKGROUND

As concepts of smart home and artificial intelligence are proposed, smart home products have gradually emerged in the market in recent years. A set-top box used for television/video reception and output is used as an example. As intelligent elements are added, products with main features such as gaming, voice recognition, and facial recognition are derived, and have won attention of many consumers. In other words, a smart home device has become a trend in a future home.

An existing smart home device usually includes a voice collection module and an image collection module. By identifying a model and a database, the existing smart home device compares collected sounds and images with those in the model and the database, and parses meanings of the sounds and images, to control the smart home device to provide feedback. For example, when "listening to music" is recognized through voice recognition, a music player is automatically opened and plays music. The voice collection module performs collection via a microphone or a microphone array, and the image collection module performs collection via a camera.

The camera of the image collection module usually has an image collection range less than 180 degrees, and is easily blocked by a wall or an arranged object. The microphone or the microphone array of the voice collection module has an effective sound pickup range. A sound signal collected by the microphone or microphone array beyond the sound pickup range is relatively weak and cannot be distinguished from noise.

The smart home device is usually placed at a dedicated location in a home. Because the voice collection module and the image collection module in the smart home device have limited collection ranges, the smart home device has a voice recognition range and an image recognition range that are limited and cannot cover an entire living area. Consequently, a user uses the smart home device in limited areas, and user experience is affected.

SUMMARY

To resolve the foregoing technical problem, specific embodiments of this application provide an inter-device data migration method and a device. When a user interacts with a device through an application on the device, if the user goes beyond a signal collection range of the device, the application running on the device is migrated to a device with a signal collection range in which the user is currently located, for running. In this way, the user continues to interact, through the application, with the device to which the application is migrated.

The embodiments of this application are implemented as follows:

According to a first aspect, an embodiment of this application provides an inter-device data migration method, including: interacting, by a first device, with a user through an application in a data collection range; when determining that the user is not located in the data collection range, determining, by the first device, that the user is located in a data collection range of a second device in a network; and when the second device supports the application, sending, by the first device, to-be-migrated data to the second device, so that the second device interacts with the user based on the to-be-migrated data, where the to-be-migrated data includes information about the application and progress information, and the progress information indicates progress of interaction between the first device and the user.

In one embodiment, when the user performs interaction through the application and the user is not located in the data collection range, a specific device with a data collection range in which the user is currently located is determined. When the device can execute the application, the application is migrated to the device, so that the user directly interacts with the device through the application running on the device. This avoids a problem that the user cannot move when interacting with a fixed device through the application.

In a possible design, the determining, by the first device, that the user is located in a data collection range of a second device in a network includes: sending, by the first device, detection information to at least one device in the network, where the detection information instructs the at least one device to detect whether the user is located in a data collection range of the at least one device; and receiving, by the first device, acknowledgment information sent by the second device in the at least one device, where the acknowledgment information is used to indicate that the user is located in the data collection range of the second device.

In a possible design, the detection information is sent to the at least one device through broadcast.

In a possible design, the method further includes: when the second device does not support the application, receiving, by the first device, data of the user collected by the second device; and continuing, by the first device, interacting with the user based on the data of the user collected by the second device.

In a possible design, the sending, by the first device, detection information to at least one device in the network includes: determining a device that can run the application in the network; and sending the detection information to the device that can run the application. Information about the user collected by the application at a current position of the user is received, so that the user can still interact with the device through the application on the device when the user is far away from the first device.

According to a second aspect, an embodiment of this application provides an inter-device data migration method, including: receiving, by a second device, detection information sent by a first device, where the detection information instructs the second device to detect whether a user is located in a data collection range of the second device; determining, by the second device, that the user is located in the data collection range of the second device; sending, by the second device, acknowledgment information to the first device, where the acknowledgment information is used to indicate that the user is located in the data collection range of the second device; when the second device supports an application, receiving, by the second device, to-be-migrated data sent by the first device, where the to-be-migrated data includes information about the application and progress information, and the progress information indicates progress of interaction between the first device and the user; and interacting, by the second device, with the user through the application based on the to-be-migrated data.

In a possible design, the detection information received by the second device is broadcast information.

In a possible design, the method further includes: when the second device does not support the application, collecting, by the second device, data of the user; and sending, by the second device, the collected data of the user to the first device, where the data of the user instructs the first device to continue interacting with the user based on the data of the user collected by the second device.

In a possible design, the method further includes: sending, by the second device, detection stop information to at least one device in a network, where the detection stop information instructs a device to stop detection, where the device is detecting, based on the detection information sent by the first device, whether the user is located in a data collection range of the device.

According to a third aspect, an embodiment of this application provides a device, including: an interaction module, configured to interact with a user through an application in a data collection range of the device; a determining module, configured to: when determining that the user is not located in the data collection range of the device, determine that the user is located in a data collection range of another device in a network; and a sending module, configured to: when the another device supports the application, send to-be-migrated data to the another device, so that the another device interacts with the user based on the to-be-migrated data, where the to-be-migrated data includes information about the application and progress information, and the progress information indicates progress of interaction between the device and the user.

In a possible design, the determining module is specifically configured to: when determining that the user is not located in the data collection range of the device, send detection information to at least one device in the network, where the detection information instructs the at least one device to detect whether the user is located in a data collection range of the at least one device; and receive acknowledgment information sent by the another device in the at least one device, where the acknowledgment information is used to indicate that the user is located in the data collection range of the another device.

In a possible design, the detection information is sent through broadcast.

In a possible design, the device further includes: a receiving module, configured to: when the another device does not support the application, receive data of the user collected by the another device; where the interaction module is further configured to continue interacting with the user based on the data of the user collected by the another device.

According to a fourth aspect, an embodiment of this application provides a device, including: a receiving module, configured to receive detection information sent by a first device, where the detection information instructs the device to detect whether a user is located in a data collection range of the device; a determining module, configured to determine that the user is located in the data collection range of the device; a sending module, configured to send acknowledgment information to the first device, where the acknowledgment information is used to indicate that the user is located in the data collection range of the device; where the receiving unit is further configured to: when the device supports an application, receive to-be-migrated data sent by the first device, where the to-be-migrated data includes information about the application and progress information, and the progress information indicates progress of interaction between the first device and the user; and an interaction module, configured to interact with the user through the application based on the to-be-migrated data.

In a possible design, the detection information is sent through broadcast.

In a possible design, the device further includes a collection module, configured to collect data of the user when the device does not support the application; where the sending module is further configured to send the data of the user to the first device, where the data of the user instructs the first device to continue interacting with the user based on the data of the user.

In a possible design, the device further includes a sending module, configured to send detection stop information to at least one device in a network, where the detection stop information instructs a device to stop detection, where the device is detecting, based on the detection information sent by the first device, whether the user is located in a data collection range of the device.

According to a fifth aspect, an embodiment of this application provides an apparatus, including a processor and a memory, where the memory stores an operation instruction that can be executed by the processor, and the processor reads the operation instruction in the memory to implement the method according to any one of the first aspect or the possible designs of the first aspect.

According to a sixth aspect, an embodiment of this application provides an apparatus, including a processor and a memory, where the memory stores an operation instruction that can be executed by the processor, and the processor reads the operation instruction in the memory to implement the method according to any one of the second aspect or the possible designs of the second aspect.

According to a seventh aspect, an embodiment of this application provides a computer-readable storage medium. The computer-readable storage medium includes an instruction. When the instruction is run on a computer, the computer is enabled to perform the method according to any one of the first aspect or the possible designs of the first aspect.

According to an eighth aspect, an embodiment of this application provides a computer-readable storage medium. The computer-readable storage medium includes an instruction. When the instruction is run on a computer, the computer is enabled to perform the method according to any one of the second aspect or the possible designs of the second aspect.

According to a ninth aspect, an embodiment of this application provides a computer program product including an instruction. When the computer program product runs on a computer, the computer is enabled to perform the method according to any one of the first aspect or the possible designs of the first aspect.

According to a tenth aspect, an embodiment of this application provides a computer program product including an instruction. When the computer program product runs on a computer, the computer is enabled to perform the method according to any one of the second aspect or the possible designs of the second aspect.

DESCRIPTION OF EMBODIMENTS

The following more specifically describes a communication method in this application by using specific embodiments.

Figure 1:
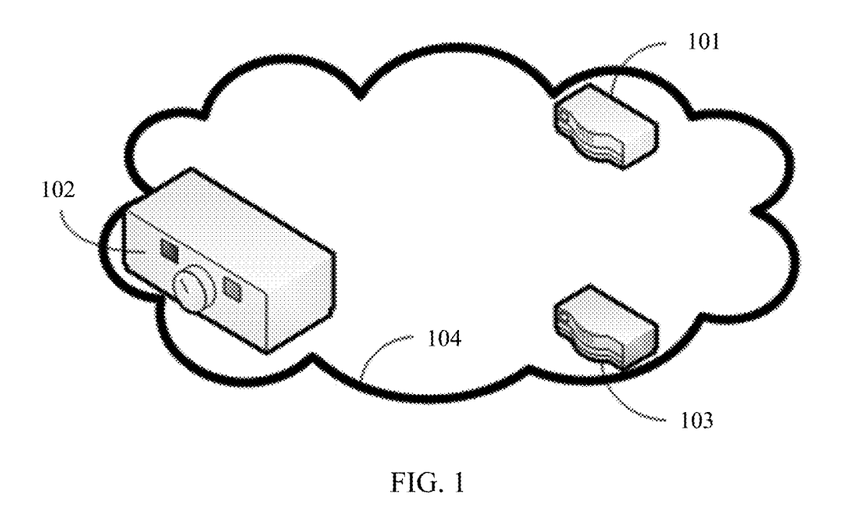
FIG. 1 is a diagram of an application scenario of a device according to an embodiment of this application.

FIG. 1 is a diagram of an application scenario of a device according to an embodiment of this application. As shown in FIG. 1, a first device 101, a second device 102, and a third device 103 are included. In an example, the first device 101 and the third device 103 may be smart set-top boxes, and the second device 102 may be a smart speaker. The first device 101, the second device 102, and the third device 103 are connected to the same local area network. The first device 101, the second device 102, and the third device 103 may be all connected to the same router in a wired or wireless manner to establish the local area network.

The application scenario is merely an example in the embodiments of this application. The first device 101, the second device 102, the third device 103, and application scenarios in which the first device 101, the second device 102, and the third device 103 are located are not limited in this application. The first device 101, the second device 102, and the third device 103 each may alternatively establish a network connection in any other manner.

In an embodiment of this application, at least one device may perform an operation based on a voice and/or a face and an action. For example, the first device 101 and the third device 103 each include an image collection module and a voice collection module, and the second device 102 includes only a voice collection module. The image collection module is usually a camera, and the voice collection module is usually a microphone or a microphone array. Any device in this application may perform an operation by using another feasible operation method. The operation method of the device is not limited in this application.

In a process of performing intelligent control on a device, the device may be controlled through voice recognition, facial recognition, or action recognition to enable or disable some functions or applications. For example, when the device recognizes "listening to music" through voice recognition, the device automatically opens a music player and plays music.

The image collection module, that is, the camera, usually has an image collection range less than 180 degrees, and is easily blocked by a wall or an arranged object. The voice collection module, that is, the microphone, has an effective sound pickup range. A sound signal that is collected beyond the range is relatively weak, and cannot be distinguished from noise. In addition, based on a position of the microphone in the device and an arrangement manner of the microphone array, the voice collection module has different sound pickup ranges in different directions.

Therefore, a data collection range of the device is limited. When using an application on the device, a user needs to be located in the data collection range of the device to avoid impact on user experience.

To resolve the foregoing technical problem, an embodiment of this application provides an inter-device data migration method. When a user interacts with a first device through an application on the first device, the first device may detect whether the user is located in a data collection range of the first device. When the user is not located in the data collection range of the first device, the first device needs to determine a current position of the user. When the user is located in a data collection range of a second device in a network, the first device sends to-be-migrated data to the second device, so that the application and a service that are run on the first device are migrated to the second device and continue to be run.

The second device may be alternatively used as an information collection module of the first device. The first device receives data of the user collected by the second device, and continues interacting with the user based on the data of the user collected by the second device. In this way, the user can freely move when performing interaction through the application.

Figure 2:
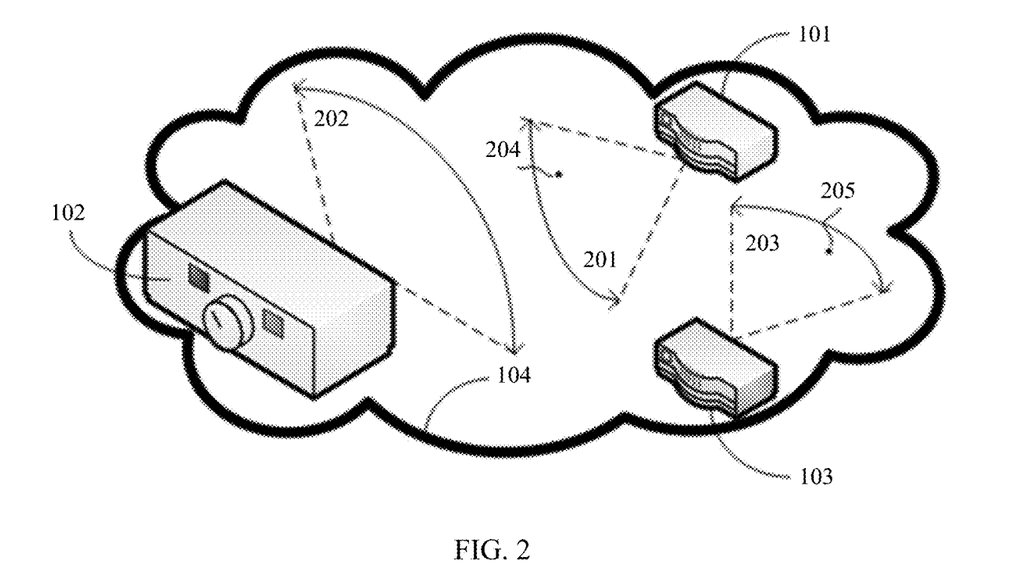
FIG. 2 is a schematic diagram of an arrangement of a device in a network according to an embodiment of this application.

In an example, FIG. 2 is a schematic diagram of an arrangement of a device in a network according to an embodiment of this application. As shown in FIG. 2, a first device 101, a second device 102, and a third device 103 are included. The first device 101, the second device 102, and the third device 103 are located in a local area network 104. The first device 101 has a first data collection range 201, the second device 102 has a second data collection range 202, and the third device 103 has a third data collection range 203.

The first device 101 starts a voice application according to an instruction and performs a corresponding voice service. When starting the application, the first device further determines whether the application is an application for which a position of a user needs to be determined. When the application is the application for which the position of the user needs to be determined, the first device collects the position of the user, for example, a current position 204. When the application is an application for which the position of the user does not need to be determined, the first device may not perform another operation.

The first device collects the position of the user by photographing an image via a camera on the first device and/or collecting voice information via a microphone on the first device. The first device determines, based on the collected image information and/or voice information, whether the collected image information and/or voice information include/includes image information and/or voice information of the user. When the collected image information and/or voice information include/includes the image information and/or voice information of the user, the first device determines that the user is located in the range of the first device. When the collected image information and/or voice information do not include/does not include the image information and/or voice information of the user, the first device determines that the user is not located in the range of the first device.

When the first device 101 determines that the user is not located in the data collection range 201 of the first device 101, the first device 101 sends broadcast information to another adjacent device in the network. The second device 102 and the third device 103 can receive the broadcast information sent by the first device.

The second device 102 and the third device 103 can start, based on the broadcast information, a program for monitoring a position of the user. When the third device 103 captures a position 205 of the user, the third device 103 sends acknowledgment information to the first device 101, where the acknowledgment information is used to indicate that the user is located in the data collection range of the third device.

After determining, based on the acknowledgment information, that the user is located in the data collection range of the third device, the first device further needs to determine whether the third device supports the application running on the first device. When the third device can support the application, the first device sends to-be-migrated data to the third device. The to-be-migrated data includes information about the application and progress information, and the progress information includes but is not limited to a service scenario and progress of the service. The third device 103 attempts to restore content of the service based on received information about the service running on the first device 101 for the user, and continues to interact with the user.

After the third device 103 restores the service running on the first device 101 for the user, the third device 103 further returns a corresponding notification to the first device 101. The first device closes, based on the notification, the application running on the first device.

When the third device 103 cannot run the service, the third device 103 sends collected information of the user to the first device 101. When receiving the information of the user sent by the third device 103, the first device 101 stops collecting information of the user, and the first device 101 continues interacting with the user through the application based on the information of the user collected by the third device 103.

Figure 3:
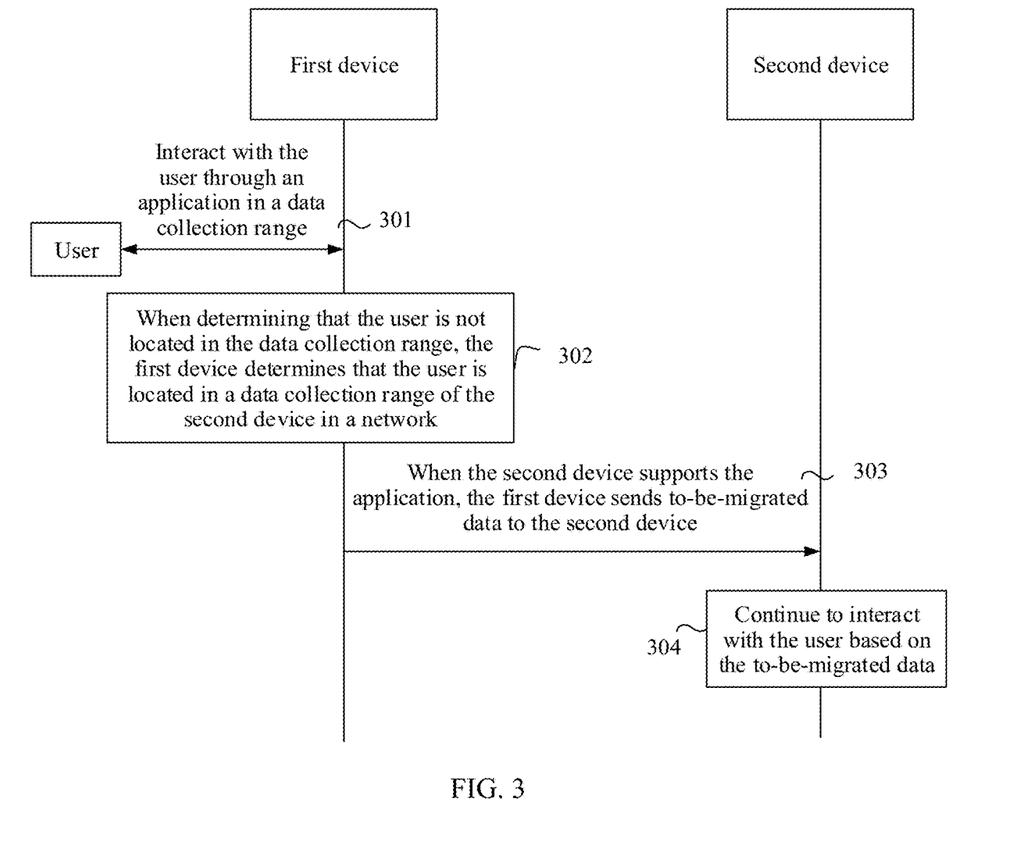
FIG. 3 shows a method for migrating a service in a local area network according to an embodiment of this application.

The following further describes inter-device service migration in the embodiments of this application. FIG. 3 shows a method for migrating a service in a local area network according to an embodiment of this application. As shown in FIG. 3, the method includes the following steps.

S301: A first device interacts with a user through an application in a data collection range.

The first device includes a camera and/or a microphone array. The camera can obtain an action of a user or perform facial recognition, and the microphone array can recognize a voice of the user. The first device may launch the application according to an instruction (which may include a voice and/or a face and an action) and perform a corresponding operation. This is not limited in this application.

The user performs an operation on the first device based on the voice and/or the face and the action, so that the first device performs a corresponding operation based on the voice and/or the face and the action. In addition, the first device further receives, through the application, information sent by the user. For example, the first device collects voice information and image information of the user through video chat software.

Optionally, when the first device opens the application, the first device further determines whether the application is required for interaction between the first device and the user. If the application is required for interaction between the first device and the user, the first device starts a program for detecting a position of the user. The program for detecting a position of the user may determine, via the camera, whether the user is located in the data collection range of the first device. The program for detecting a position of the user may alternatively determine, based on a sound collected by the microphone array, whether the collected sound includes a voice of the user, and determine whether the user is located in a data collection range of the first device.

The first device collects the position of the user by photographing an image via the camera on the first device and/or collecting voice information via a microphone. The first device determines, based on the collected image information and/or voice information, whether the collected image information and/or voice information include/includes image information and/or voice information of the user. When the collected image information and/or voice information include/includes the image information and/or voice information of the user, the first device determines that the user is located in the data collection range of the first device. When the collected image information and/or voice information do not include/does not include the image information and/or voice information of the user, the first device determines that the user is not located in the data collection range of the first device.

S302: When determining that the user is not located in the data collection range of the first device, the first device determines that the user is located in a data collection range of a second device in a network.

When determining that the user is located in the data collection range of the first device, the first device may not perform another operation. When determining that the user is not located in the data collection range of the first device, the first device sends detection information to at least one adjacent device. The detection information may be sent through broadcast, or may be sent in another manner. This is not limited in this application.

In an embodiment of this application, the first device includes a plurality of devices that are connected to each other. The plurality of devices may be shown in FIG. 1 and FIG. 2. The first device may determine a current position of the user via the plurality of devices that are connected to each other. Each of the plurality of devices that are connected to each other determines whether the user is located in a data collection range of the device, to determine the current position of the user.

When determining that the user is located in the data collection range of the second device, the first device further needs to determine whether the second device supports the application through which the first device interacts with the user.

In an aspect, each device in the network may store information about a hardware device and a software device that are included in another device. The first device determines, by querying information about a hardware device and a software device that are included in the second device, whether the second device can execute the application.

In an example, each device in the network sends, when being powered on, information about a hardware device included in the device and information about software installed on the device. For example, the sent information about the hardware device is used to indicate that the device includes camera information and microphone information, and the information about the installed software is used to at least indicate specific software that can be currently run by the device. After receiving the information that is sent by the second device and that is about the hardware device and the installed software that are included in the second device, the first device stores the information. The first device determines, by comparing the information about the hardware device included in the second device and/or the information about the installed software included in the second device with software and hardware that are required for executing the application, whether the second device can execute the application.

In a second aspect, the first device may determine, by sending corresponding query information to the second device, whether the second device can execute the application.

S303: When the user is located in the data collection range of the second device and the second device supports the application, the first device sends to-be-migrated data to the second device.

The to-be-migrated data is used to enable the second device to interact with the user based on the to-be-migrated data. The to-be-migrated data includes information about the application and progress information. The information about the application includes but is not limited to a name or an identifier of the application, and the progress information indicates progress of interaction between the first device and the user.

S304: The second device interacts with the user through the application based on the to-be-migrated data, and the second device executes the application based on the received information about the application on the first device.

When the second device receives the to-be-migrated data sent by the first device, the second device executes corresponding information based on the information that is about the application and that is included in the received to-be-migrated data, and adjusts progress information in a corresponding service scenario to be the same as the progress information included in the to-be-migrated data; and the second device interacts with the user through the application based on collected information sent by the user. In this way, the application through which the first device interacts with the user is automatically migrated to the second device, and the second device continues to interact with the user.

When the second device opens the corresponding application, the second device further sends response information to the first device, where the response information is used to indicate that the second device has interacted with the user through the application; and the first device closes, based on the response information, the application running on the first device.

Optionally, when the second device cannot execute the application, the second device sends collected information of the user to the first device. The first device continues interacting with the user based on the data of the user collected by the second device.

Optionally, when the second device detects the user, the second device sends information for stopping detection of the user. The second device may directly send the information for stopping detection of the user to the first device and the third device, or may send the information for stopping detection of the user to the local area network. The information that is used for stopping detection of the user and that is sent through the local area network may be sent through broadcast, or may be sent in another manner. This is not limited in this application. When another device receives the information that is used for stopping detection of the user and that is sent by the second device, the another device that is detecting a position of the user based on the detection information stops the detection.

The following describes an embodiment that the first device determines the current position of the user via the plurality of devices that are connected to each other.

Figure 4:
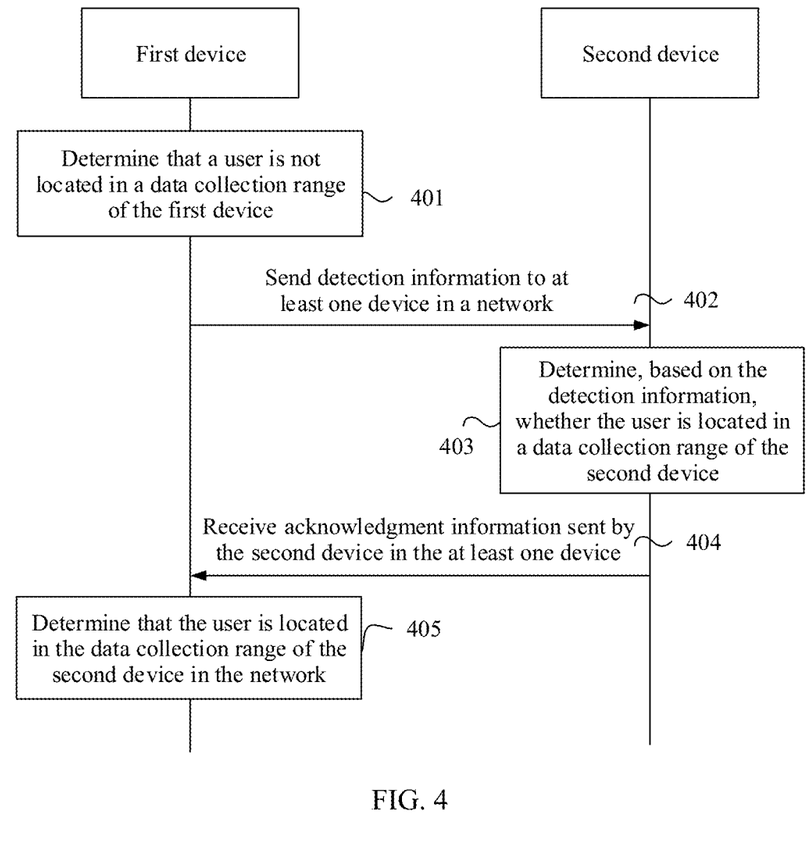
FIG. 4 shows a method for determining a current position of a user according to an embodiment of this application.

In an example, FIG. 4 shows a method for determining a current position of a user according to an embodiment of this application. As shown in FIG. 4, the method includes the following steps.

S401: A first device determines that a user is not located in a data collection range of the first device.

In an embodiment of this application, the first device may determine, based on collected voice information or image information, whether the user is located in the data collection range of the first device. The first device includes an image collection module and a voice collection module. The image collection module is usually a camera, and the voice collection module is usually a microphone or a microphone array. The first device takes photos via the camera and/or collects voice information via the microphone. The data collection range of the first device is a photographing area of the camera and an area in which the microphone can collect effective voice information. The first device determines, by analyzing whether the image information and/or the voice information include/includes image information and/or voice information of the user, whether the user is located in the data collection range of the first device. When determining, by analyzing the image information and/or voice information, that the image information and/or voice information do not include/does not include the image information and/or voice information of the user, the first device determines that the user is not located in the data collection range of the first device.

S402: Send detection information to at least one device in a network.

When the first device 101 determines that the user is not located in the data collection range 201 of the first device 101, the first device 101 sends the detection information to another adjacent device in a local area network. The another adjacent device includes a second device, so that the another device adjacent to the first device in the local area network determines whether the user is located in a data collection range of the another adjacent device.

Optionally, the at least one device in the same local area network is a device that can receive information about an application that is opened on the first device and through which interaction needs to be performed. For example, when the application opened on the first device is a video application, the at least one device in the same local area network is a device that can collect both voice information and image information.

Optionally, before sending the detection information to the at least one device in the local area network, the first device further determines a function of the another adjacent device included in the local area network. When the device is a smart device including a camera and/or a microphone or a microphone array, the first device sends the detection information to the device. When the device is a device that does not include a camera and/or a microphone or a microphone array, the first device may not send the detection information to the device.

S403: The second device determines, based on the detection information, whether the user is located in a data collection range of the second device.

The another device that is adjacent to the first device and includes the second device can receive the detection information sent by the first device. The following uses the second device as an example for description. A processing method used when another device receives the detection information sent by the first device is the same as a processing method used when the second device receives the detection information.

The second device determines, based on the detection information, whether the user is located in the data collection range of the second device. A method for determining, by the second device, whether the user is located in the data collection range of the second device is the same as a method for determining, by the first device, whether the user is located in the data collection range of the first device.

The second device detects position information of the user by photographing an image via a camera on the second device and/or collecting voice information via a microphone on the second device. The second device determines, based on the collected image information and/or voice information, whether the collected image information and/or voice information include/includes image information and/or voice information of the user. When the collected image information and/or voice information include/includes the image information and/or voice information of the user, the second device determines that the user is located in the range of the second device. When the collected image information and/or voice information do not include/does not include the image information and/or voice information of the user, the second device determines that the user is not located in the range of the second device.

The detection information may be a cyclic instruction including maximum detection time. In an example, the detection information may further specify cycle execution time or the number of cycle execution times. When the second device determines, based on the detection information, that the user is not located in the data collection range of the second device, the second device performs the next detection. When time or the number of times for executing the detection by the second device reaches the predetermined time or the predetermined number of times, the second device stops executing the detection.

S404: The first device receives acknowledgment information sent by the second device in the at least one device.

When the second device determines that the user is located in the data collection range of the second device, the second device sends the acknowledgment information to the first device to notify the first device that the user is located in the data collection range of the second device.

S405: Determine, based on the acknowledgment information, that the user is located in the data collection range of the second device in the network.

The first device receives the acknowledgment information sent by the second device. The first device determines, based on the acknowledgment information, that the user is located in the data collection range of the second device.

The following describes an embodiment that the first device determines, by sending corresponding query information to the second device, whether the second device can execute the application.

Figure 5:
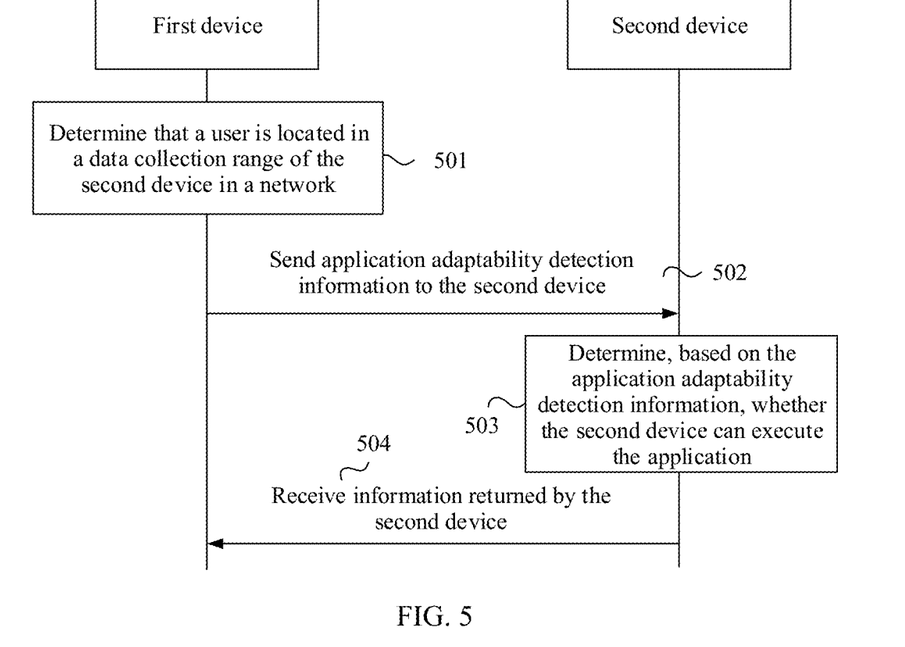
FIG. 5 shows a method for determining whether a second device can execute an application according to an embodiment of this application.

In an example, FIG. 5 shows a method for determining whether a second device can execute an application according to an embodiment of this application. As shown in FIG. 5, the method includes the following steps.

S501: A first device determines that a user is located in a data collection range of the second device in a network.

A manner of determining a current position of the user by the first device is the same as a manner shown in FIG. 4. Details are not repeated in this application.

S502: The first device sends application adaptability detection information to the second device.

The application adaptability detection information includes information about the application running on the first device.

S503: The second device determines, based on the application adaptability detection information, whether the second device can execute the application.

In addition, after performing corresponding detection, the second device further sends a detection result to the first device.

S504: The first device receives detection result information returned by the second device.

The detection result information is used to indicate whether the second device can execute the application. After receiving the detection result information, the first device determines, based on the detection result information, whether the second device can execute the application.

Figure 6:
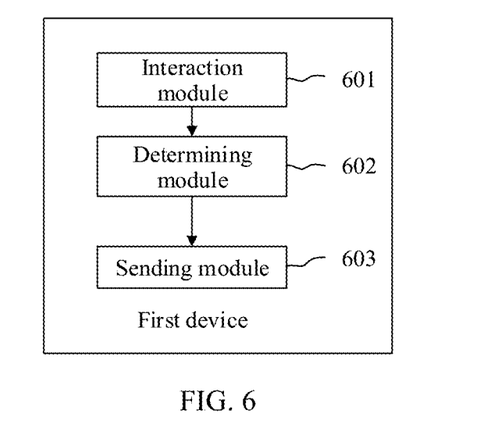
FIG. 6 shows a device according to an embodiment of this application.

FIG. 6 shows a device according to an embodiment of this application. The device includes an interaction module 601, a determining module 602, and a sending module 603.

The interaction module 601 is configured to interact with a user through an application in a data collection range of the device. The determining module 602 is configured to: when determining that the user is not located in the data collection range of the device, determine that the user is located in a data collection range of another device in a network. The sending module 603 is configured to: when the another device supports the application, send to-be-migrated data to the another device, so that the another device interacts with the user based on the to-be-migrated data, where the to-be-migrated data includes information about the application and progress information, and the progress information indicates progress of interaction between the device and the user.

Optionally, the determining module 602 is configured to: when determining that the user is not located in the data collection range of the device, send detection information to at least one device in the network, where the detection information instructs the at least one device to detect whether the user is located in a data collection range of the at least one device; and receive acknowledgment information sent by the another device in the at least one device, where the acknowledgment information is used to indicate that the user is located in the data collection range of the another device.

Optionally, the detection information is sent through broadcast.

Optionally, the receiving module 604 is configured to: when the another device does not support the application, receive data of the user collected by the another device. The interaction module 601 is further configured to continue interacting with the user based on the data of the user collected by the another device.

Figure 7:
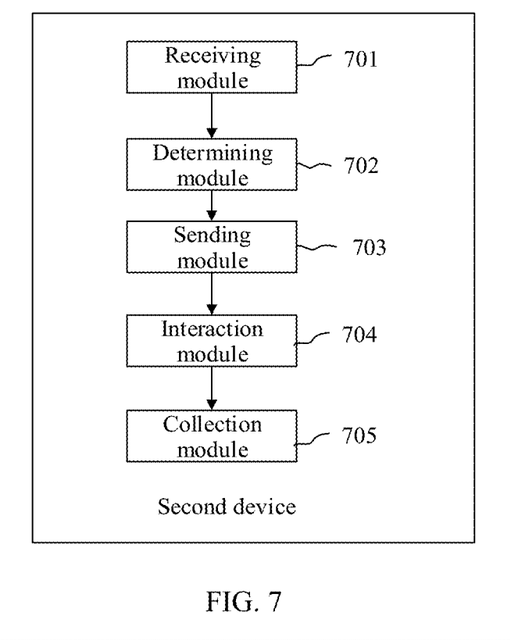
FIG. 7 shows a device according to an embodiment of this application.

FIG. 7 shows a device according to an embodiment of this application. The device includes a receiving module 701, a determining module 702, a sending module 703, an interaction module 704, and a collection module 705.

The receiving module 701 is configured to receive detection information sent by a first device, where the detection information instructs the device to detect whether a user is located in a data collection range of the device. The determining module 702 is configured to determine that the user is located in the data collection range of the device. The sending module 703 is configured to send acknowledgment information to the first device, where the acknowledgment information is used to indicate that the user is located in the data collection range of the device. The receiving module 701 is further configured to: when the device supports an application, receive to-be-migrated data sent by the first device, where the to-be-migrated data includes information about the application and progress information, and the progress information indicates progress of interaction between the first device and the user. The interaction module 704 is configured to interact with the user through the application based on the to-be-migrated data.

Optionally, the detection information is sent through broadcast.

Optionally, the collection module 705 is configured to collect data of the user when the device does not support the application. The sending module 703 is further configured to send the data of the user to the first device, where the data of the user instructs the first device to continue interacting with the user based on the data of the user.

Optionally, the sending module 703 is further configured to send detection stop information to at least one device in a network, where the detection stop information instructs a device to stop detection, where the device is detecting, based on the detection information sent by the first device, whether the user is located in a data collection range of the device.

Figure 8:
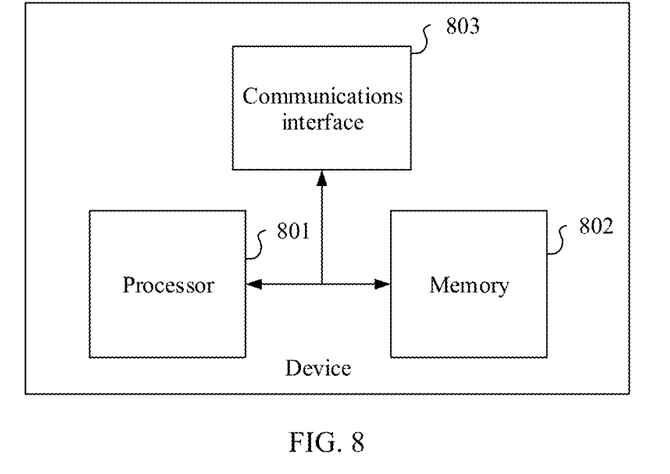
FIG. 8 is a schematic structural diagram of a device according to an embodiment of this application.

FIG. 8 is a schematic structural diagram of a device according to an embodiment of this application. As shown in FIG. 8, the device may be shown in FIG. 1 to FIG. 5. The device includes a processor 801, a memory 802, and a communications interface 803.

The processor 801 may be a general-purpose central processing unit (CPU), a microprocessor, an application-specific integrated circuit (ASIC), or one or more integrated circuits. The processor is configured to execute a related program to implement the technical solutions provided in the foregoing method embodiments of the present application.

The memory 802 may be a read-only memory (ROM), a static storage device, a dynamic storage device, or a random access memory (RAM). The memory 802 may store an application program. When the technical solutions provided in the embodiments of the present invention are implemented through software or firmware, the program code used to implement the steps performed by the first device in the foregoing embodiments in FIG. 1 to FIG. 5 and any optional technical solution provided in the method embodiments is stored in the memory 802 and is executed by the processor 801.

The communications interface 803 is configured to connect to another device.

The processor 801 is configured to:

interact with a user through an application in a data collection range of the device; and when determining that the user is not located in the data collection range of the device, determine that the user is located in a data collection range of another device in a network. When the another device supports the application, the communications interface 803 sends to-be-migrated data to the another device, so that the another device interacts with the user based on the to-be-migrated data, where the to-be-migrated data includes information about the application and progress information, and the progress information indicates progress of interaction between the device and the user.

When determining that the user is not located in the data collection range of the device, the device sends detection information to at least one device in the network, where the detection information instructs the at least one device to detect whether the user is located in a data collection range of the at least one device. The device receives acknowledgment information sent by the another device in the at least one device, where the acknowledgment information is used to indicate that the user is located in the data collection range of the another device.

The detection information is sent through broadcast.

When the another device does not support the application, the device receives data of the user collected by the another device, and continues interacting with the user based on the data of the user collected by the another device.

The steps and the embodiments performed by the first device in the foregoing embodiments in FIG. 1 to FIG. 5 are also applicable to the device shown in FIG. 8 in this embodiment. Details are not described herein.

Figure 9:
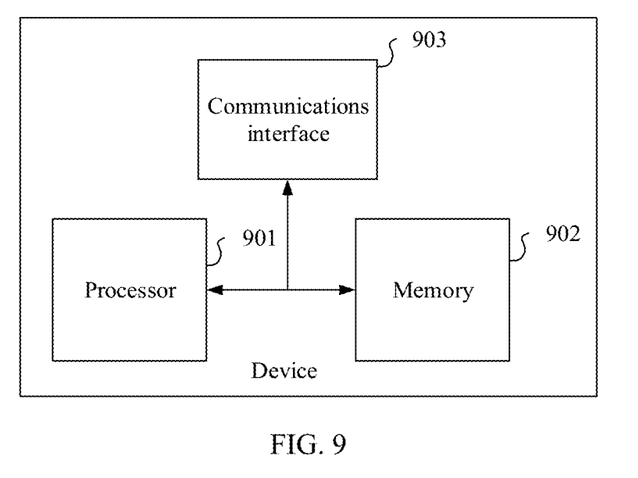
FIG. 9 is a schematic structural diagram of a device according to an embodiment of this application.

FIG. 9 is a schematic structural diagram of a rating apparatus according to an embodiment of this application. As shown in FIG. 9, the device may be shown in FIG. 1 to FIG. 5. The device includes a processor 901, a memory 902, and a communications interface 903.

The processor 901 may be a general-purpose central processing unit (CPU), a microprocessor, an application-specific integrated circuit (ASIC), or one or more integrated circuits. The processor is configured to execute a related program to implement the technical solutions provided in the foregoing method embodiments of the present invention.

The memory 902 may be a read-only memory (ROM), a static storage device, a dynamic storage device, or a random access memory (RAM). The memory 902 may store an application program. When the technical solutions provided in the embodiments of the present invention are implemented through software or firmware, the program code used to implement the steps performed by the second device in the foregoing embodiments in FIG. 1 to FIG. 5 and any optional technical solution provided in the method embodiments is stored in the memory 902 and is executed by the processor 901.

The communications interface 903 is configured to connect to another device.

The processor 901 is configured to:

receive detection information sent by a first device, where the detection information instructs the device to detect whether a user is located in a data collection range of the device; determine that the user is located in the data collection range of the device; send acknowledgment information to the first device, where the acknowledgment information is used to indicate that the user is located in the data collection range of the device; when the device supports an application, receive to-be-migrated data sent by the first device, where the to-be-migrated data includes information about the application and progress information, and the progress information indicates progress of interaction between the first device and the user; and interact with the user through the application based on the to-be-migrated data; where the received detection information is broadcast information;

when the device does not support the application, collect data of the user; and send the data of the user to the first device, where the data of the user instructs the first device to continue interacting with the user based on the data of the user collected by the device; and send detection stop information to at least one device in a network, where the detection stop information instructs a device to stop detection, where the device is detecting, based on the detection information sent by the first device, whether the user is located in a data collection range of the device.

The steps and the embodiments performed by the second device in the foregoing embodiments in FIG. 1 to FIG. 5 are also applicable to the device shown in FIG. 9 in this embodiment. Details are not described herein.

An embodiment of this application provides a computer-readable storage medium. The computer-readable storage medium stores one or more programs. The one or more programs include an instruction, and when the instruction is executed by an electronic device including a plurality of application programs, the electronic device is enabled to perform the method procedures shown in FIG. 3 to FIG. 5.

An embodiment of this application further provides a computer program product. The computer program product may run on an access network device. When the computer program product runs on the access network device, the access network device is enabled to perform the methods shown in FIG. 3 to FIG. 5.

It should be noted that the embodiments provided in this application are merely optional embodiments described in this application. Based on the embodiments, a person skilled in the art may design more embodiments. Therefore, details are not described herein.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and units, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter-device data migration method, comprising:
   interacting, by a first device, with a user through an application in a data collection range;
   determining, by the first device, that the user is located in a data collection range of a second device in a network, in response to determining that the user is out of the data collection range of the first device;
   sending, by the first device, to-be-migrated data to the second device, and interacting by the second device with the user based on the to-be-migrated data, wherein the second device supports the application, the to-be-migrated data comprises information about the application and progress information, and the progress information indicates progress of interaction between the first device and the user;
   executing, by the second device, the application based on the received information about the application on the first device; and
   receiving, by the first device, data of the user collected by the second device, and continuing, by the first device, interacting with the user based on the data of the user collected by the second device, wherein the second device does not support the application,
   wherein the second device executes corresponding information based on the information that is about the application and that is included in the received to-be-migrated data, and adjusts progress information in a corresponding service scenario to be the same as the progress information included in the to-be-migrated data, and
   wherein when the second device opens the corresponding application, the second device further sends response information to the first device, where the response information is used to indicate that the second device has interacted with the user through the application, and the first device closes, based on the response information, the application running on the first device.

2. The data migration method according to claim 1, wherein the determining, by the first device, that the user is located in the data collection range of the second device in the network comprises:
   sending, by the first device, detection information to at least one device in the network, wherein the detection information instructs the at least one device to detect whether the user is located in a data collection range of the at least one device; and receiving, by the first device, acknowledgment information sent by the second device in the at least one device, wherein the acknowledgment information is used to indicate that the user is located in the data collection range of the second device.

3. The method according to claim 2, wherein the detection information is sent to the at least one device through broadcast.

4. The method according to claim 2, further comprising:
determining a device that can run the application in the network;
sending the detection information to the device that can run the application.

5. An inter-device data migration method, comprising:
receiving, by a second device, detection information sent by a first device, wherein the detection information instructs the second device to detect whether a user is located in a data collection range of the second device;
determining, by the second device, that the user is located in the data collection range of the second device;
sending, by the second device, acknowledgment information to the first device, wherein the acknowledgment information is used to indicate that the user is located in the data collection range of the second device;
receiving, by the second device, to-be-migrated data sent by the first device, wherein the second device supports an application, the to-be-migrated data comprises information about the application and progress information, and the progress information indicates progress of interaction between the first device and the user;
interacting, by the second device, with the user through the application based on the to-be-migrated data;
executing, by the second device, the application based on the received information about the application on the first device; and
collecting, by the second device, data of the user, and sending, by the second device, the collected data of the user to the first device, wherein the second device does not support an application, and the data of the user instructs the first device to continue interacting with the user based on the data of the user collected by the second device,
wherein the second device executes corresponding information based on the information that is about the application and that is included in the received to-be-migrated data, and adjusts progress information in a corresponding service scenario to be the same as the progress information included in the to-be-migrated data, and
wherein when the second device opens the corresponding application, the second device further sends response information to the first device, where the response information is used to indicate that the second device has interacted with the user through the application, and the first device closes, based on the response information, the application running on the first device.

6. The method according to claim 5, wherein the detection information received by the second device is broadcast information.

7. The method according to claim 5, further comprising:
sending, by the second device, detection stop information to at least one device in a network, wherein the detection stop information instructs a device to stop detection, wherein the device detects, based on the detection information sent by the first device, whether the user is located in a data collection range of the device.

8. A device, comprising:
a processor configured to read instructions stored in a memory coupled to the processor, and to execute the instructions to cause the device to:
interact with a user through an application in a data collection range of the device;
determine that the user is located in a data collection range of another device in a network, in response to determining that the user is not located in the data collection range of the device;
send to-be-migrated data to the another device, so that the another device interacts with the user based on the to-be-migrated data, wherein the another device supports the application, the to-be-migrated data comprises information about the application and progress information, and the progress information indicates progress of interaction between the device and the user; and
receive data of the user collected by the another device, and continue interacting with the user based on the data of the user collected by the another device, wherein the another device does not support the application,
wherein the another device executes the application based on the received information about the application on the device,
wherein the another device executes corresponding information based on the information that is about the application and that is included in the received to-be-migrated data, and adjusts progress information in a corresponding service scenario to be the same as the progress information included in the to-be-migrated data, and
wherein when the another device opens the corresponding application, the another device further sends response information to the device, where the response information is used to indicate that the another device has interacted with the user through the application, and the device closes, based on the response information, the application running on the device.

9. The device of claim 8, further comprising: the memory.

10. The device of claim 8, wherein the instructions are executed to cause the device to:
send detection information to at least one device in the network, in response to determining that the user is not located in the data collection range of the device, wherein the detection information instructs the at least one device to detect whether the user is located in a data collection range of the at least one device; and
receive acknowledgment information sent by the another device in the at least one device, wherein the acknowledgment information is used to indicate that the user is located in the data collection range of the another device.

11. The device of claim 10, wherein the detection information is sent through broadcast.

12. The device of claim 8, wherein the instructions are executed to cause the device to:
determine a device that can run the application in the network;
send the detection information to the device that can run the application.

13. A device, comprising:
a processor configured to read instructions stored in a memory coupled to the processor, and to execute the instructions to cause the device to:
receive detection information sent by a first device, wherein the detection information instructs the device to detect whether a user is located in a data collection range of the device;

determine that the user is located in the data collection range of the device;

send acknowledgment information to the first device, wherein the acknowledgment information is used to indicate that the user is located in the data collection range of the device;

receive to-be-migrated data sent by the first device, wherein the device supports the application, the to-be-migrated data comprises information about the application and progress information, and the progress information indicates progress of interaction between the first device and the user;

interact with the user through the application based on the to-be-migrated data;

execute the application based on the received information about the application on the first device; and collect data of the user, and send the data of the user to the first device, wherein the device does not support the application, and the data of the user instructs the first device to continue interacting with the user based on the data of the user, wherein the device executes corresponding information based on the information that is about the application and that is included in the received to-be-migrated data, and adjusts progress information in a corresponding service scenario to be the same as the progress information included in the to-be-migrated data, and wherein when the device opens the corresponding application, the device further sends response information to the first device, where the response information is used to indicate that the device has interacted with the user through the application, and the first device closes, based on the response information, the application running on the first device.

14. The device of claim 13, further comprising: the memory.

15. The device of claim 13, wherein the detection information is sent through broadcast.

16. The device of claim 13, wherein the instructions are executed to cause the device to:

send detection stop information to at least one device in a network, wherein the detection stop information instructs a device to stop detection, wherein the device detects, based on the detection information sent by the first device, whether the user is located in a data collection range of the device.

* * * * *